United States Patent [19]
Hughes

[11] Patent Number: 5,971,665
[45] Date of Patent: Oct. 26, 1999

[54] CABLE-LAYING APPARATUS AND METHOD

[75] Inventor: E. Wayne Hughes, The Woodlands, Tex.

[73] Assignee: Oceaneering International Inc., Houston, Tex.

[21] Appl. No.: 09/166,270

[22] Filed: Oct. 5, 1998

[51] Int. Cl.[6] .................................................. F16L 1/12
[52] U.S. Cl. ............................................ 405/159; 405/164
[58] Field of Search .................................. 405/158–164, 405/165, 168.3, 174, 180, 183, 184; 37/313, 367, 345, 346

[56] References Cited

U.S. PATENT DOCUMENTS

| | | | |
|---|---|---|---|
| 3,512,367 | 5/1970 | McLallen, Jr. | 405/168.3 X |
| 4,892,443 | 1/1990 | Kunze et al. | 405/164 |
| 5,722,793 | 3/1998 | Peterson | 405/164 |

*Primary Examiner*—William Neuder
*Assistant Examiner*—Sunil Singh
*Attorney, Agent, or Firm*—Rosenblatt & Redano P.C.

[57] ABSTRACT

A cable-laying technique and apparatus are disclosed. A base is lowered to the seafloor which contains multiple cable reels, each of which is preconnected to a surface production facility. An articulated plow is lowered onto the base and manipulates a reel from its cradle. The plow is pulled by a surface vessel after obtaining the cable reel from the cradle. The cable is buried as it is payed out with the vessel pulling the plow. The plow is returned by the vessel to the base where it grabs another reel and the process is repeated. The cable does not need to be designed to support its own weight because it is payed out from the reel supported by the plow as opposed to being on the deck of the boat. Similarly, the boat structure required to perform the method is simplified due to the reduction in weight and bulk of the reels for the cables.

15 Claims, 7 Drawing Sheets

CABLE-LAYING APPARATUS AND METHOD

FIELD OF THE INVENTION

The field of this invention relates to laying/burying cable on the seafloor.

BACKGROUND OF THE INVENTION

Certain newly developed seismic techniques involve distribution of arrays of cables on the seafloor. Previously, cables laid on the floor of a body of water have been subject to damage when fishing boats would entangle the cable in their nets or other fishing equipment. Prior techniques for laying/burying cable involved very large boats which handled the spool of cable to be laid on the seafloor on the back of the deck. The boat would pull a plow and the cable would extend from the boat deck to the plow on the seafloor. Because of this method of installation/burying of the cable, the cable weight, suspended between the plow on the seafloor and the back deck of the boat, put significant stresses on the cable so that it had to be strengthened so that it could withstand the applied stresses from its own weight. As a result, the cable became very expensive due to the modifications it required to have sufficient structural strength to withstand the stresses from its own weight. Additionally, because of the heavier-duty design of the cable, the weight of the entire spool on the back of the boat further made it necessary to use much larger boats than would have otherwise been necessary had the cable been of a lighter-duty construction. In many such seismic applications, an array of multiple strands of cable must be arranged on or below the seafloor, with one end of the cable extending to a buoy or production facility. Thus, the drawbacks of prior techniques would involve expensive cables to withstand the structural stresses from suspending the cable from the boat to the plow, as well as the need for use of larger vessels than would have otherwise been necessary, had the cable simply been of a lighter-duty design.

Thus, it is an objective of the present invention to provide a technique and equipment so that the cable does not need to be unnecessarily strengthened to withstand its own weight suspended from the surface to the seafloor. With the technique of the present invention, lighter-duty boats can be used because the cable weighs less and the method for its distribution facilitates the process of creating the desired grid on the seafloor to accommodate seismic data gathering from the formations below. This technique is applicable as well to other situations where cable must be laid economically for a variety of different purposes.

Plows that lay and bury cable from a spool on the deck of a boat are known. Various versions of such plows are made by J. Ray McDermott Co., as well as American Telephone & Telegraph Company, Soil Machine Dynamics, and others.

Those of skill in the art will get a better appreciation of the apparatus and method from a review of the preferred embodiment described below.

SUMMARY OF THE INVENTION

A cable-laying technique and apparatus are disclosed. A base is lowered to the seafloor which contains multiple cable reels, each of which is preconnected to a surface production facility. An articulated plow is lowered onto the base and manipulates a reel from its cradle. The plow is pulled by a surface vessel after obtaining the cable reel from the cradle. The cable is buried as it is payed out with the vessel pulling the plow. The plow is returned by the vessel to the base where it grabs another reel and the process is repeated. The cable does not need to be designed to support its own weight because it is payed out from the reel supported by the plow as opposed to being on the deck of the boat. Similarly, the boat structure required to perform the method is simplified due to the reduction in weight and bulk of the reels for the cables.

DETAILED DESCRIPTION OF THE PREFERRED EMBODIMENT

Figure 1:
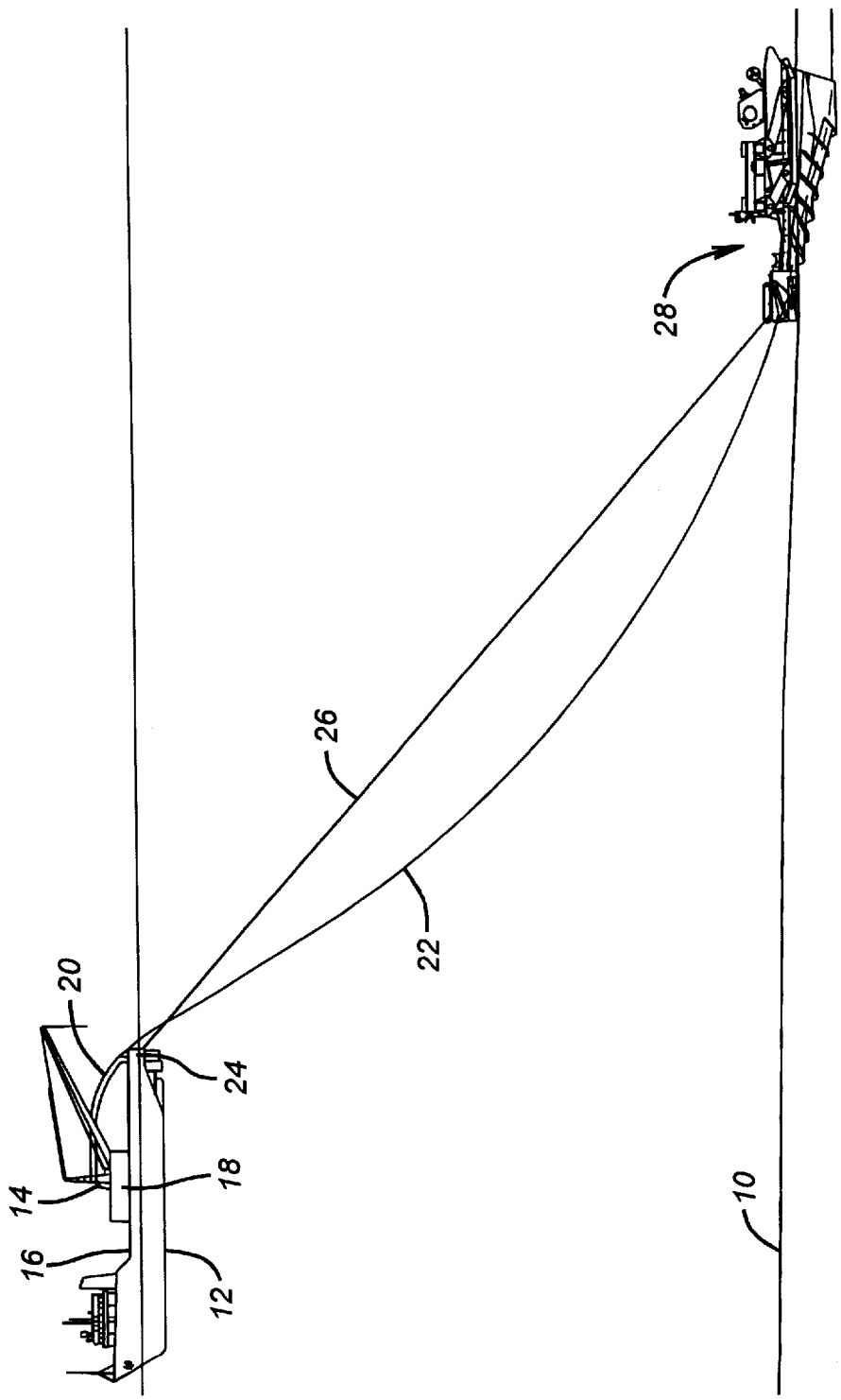
FIG. 1 illustrates a prior art technique for cable-laying/burying.

In prior techniques of laying and burying cable on the seafloor 10, the vessel 12 (shown in FIG. 1) would have the spools 14 supported on deck 16. A given spool 14 would be mounted on a support structure 18. A guide 20 supported the cable 22 over the stern 24 of the vessel 12. A tow line 26 connected the stern 24 to the plow 28. The cable 22 was paid out from the reel (or a pan) 14 as the vessel 12 advanced, while at the same time the vessel 12 towed the plow 28 by cable 26. As a result, the plow 28 formed a trench into which the cable 22 dropped as the vessel advanced and paid out the cable 22.

Figure 5:
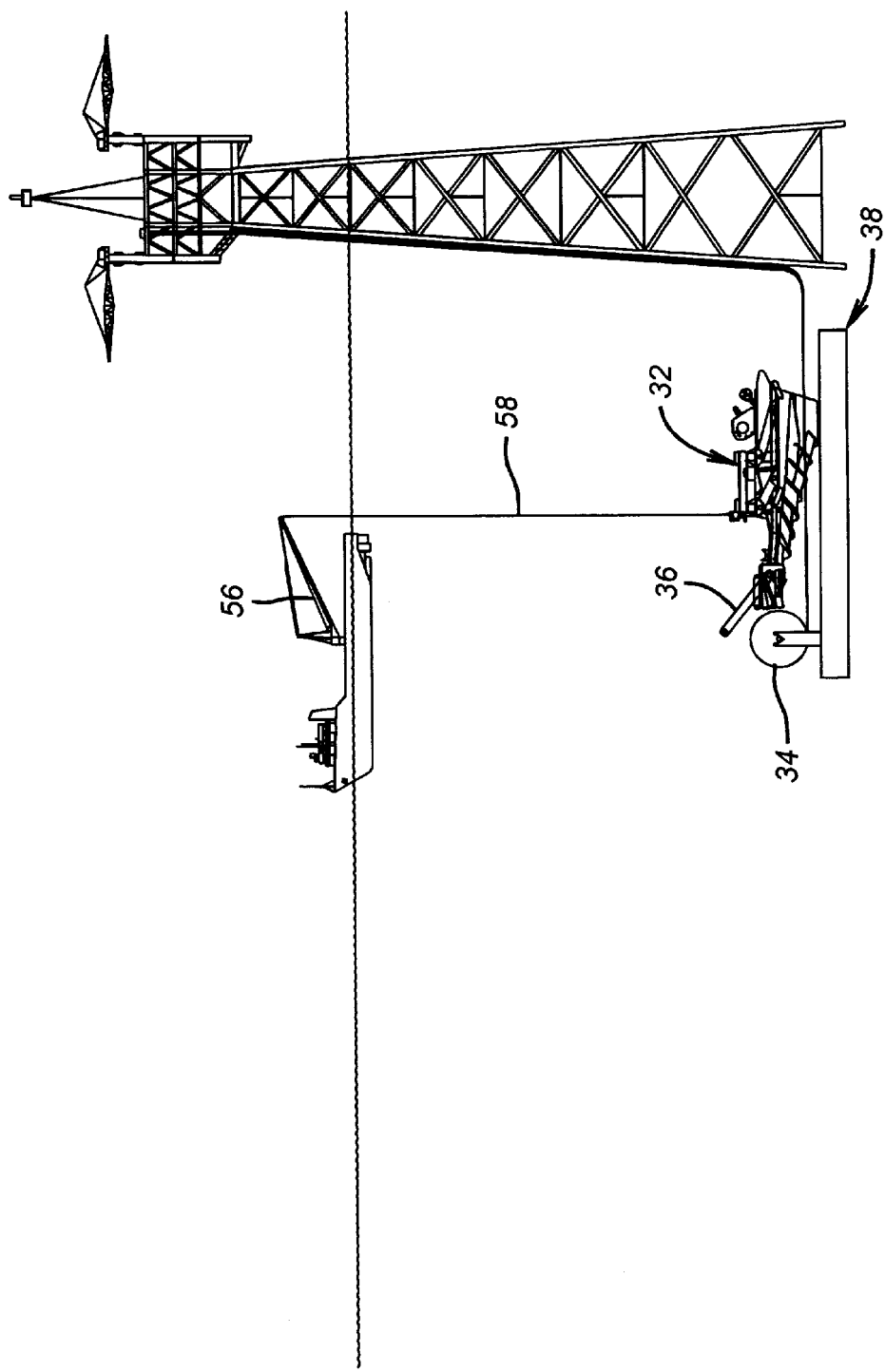
FIG. 5 illustrates the placement of the plow on the base.

As previously stated, it can be clearly seen that the cable 22 must support its own weight in the span from the stern 24 to the plow 28. Because the depth to the seafloor 10 can be thousands of feet, the physical structure of the cable 22 must be sufficiently strong to withstand the stresses induced from its own weight in the span between the stern 24 and the plow 28. In order to give the cable 22 the requisite strength to avoid being severed due to its own weight, the cable weight per foot increases dramatically. This has a tendency to require larger reels or pans 14 and even a larger vessel 12 to accommodate the weight of the cable to be laid. In modern seismic techniques, arrays of cables such as 22 need to be spread on the seafloor 10. In some instances, numerous cables are laid parallel to each other, all of them coming up to a production platform, such as 30 shown in FIG. 2. The objective of the present method and apparatus is to avoid having to needlessly overengineer the cable 22 so that it can support its own weight by having a plow 32, such as shown in FIG. 5, be able to pick up a spool 34 with an articulated arm 36.

For single cable lays, a reel could be loaded onto the plow 32 on the ship and the mated assembly lowered to the seafloor instead of using a separate base 38.

Figure 2:
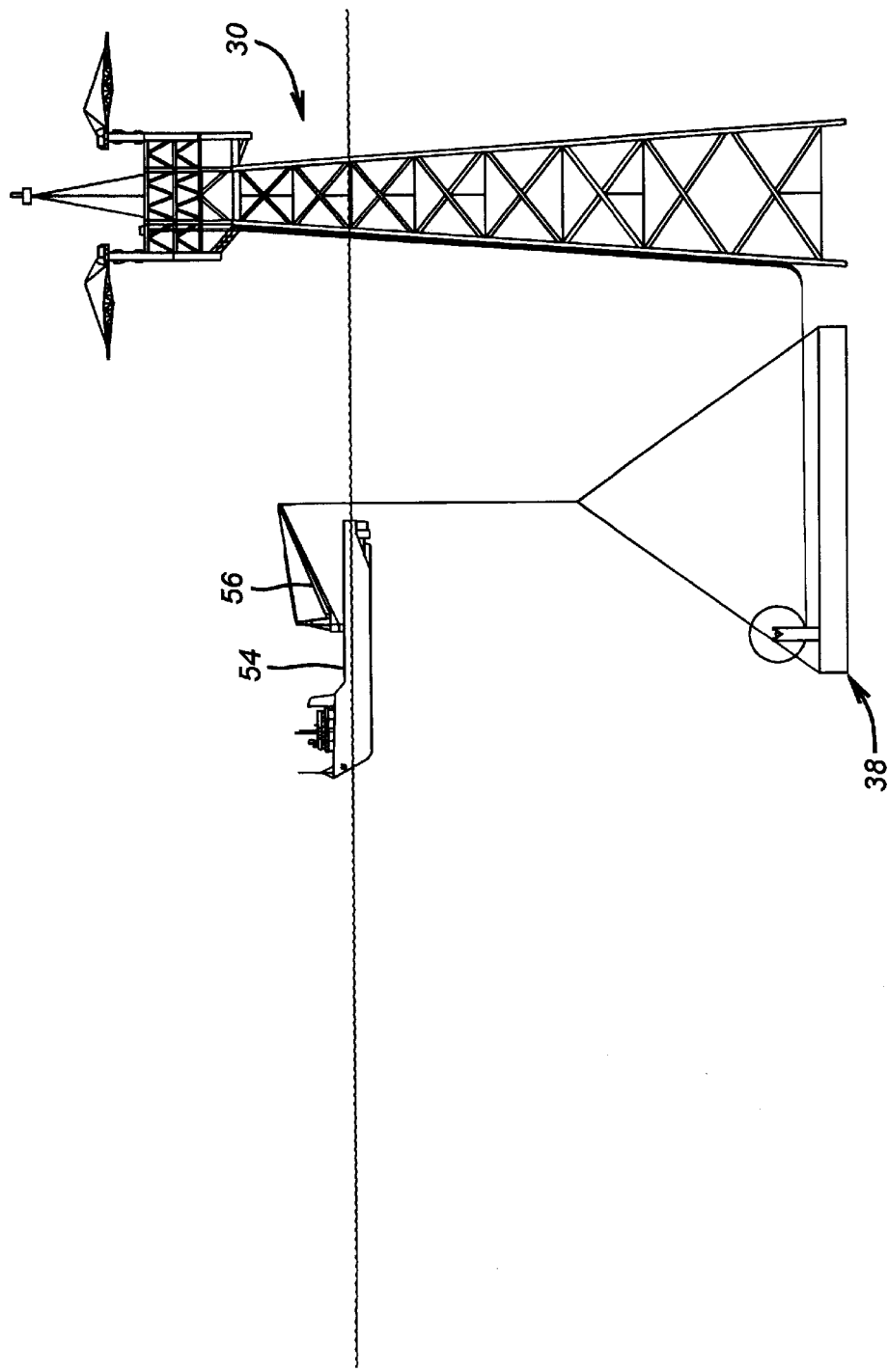
FIG. 2 illustrates the preliminary step of setting a base in position on the seafloor in the present invention.
Figure 3:
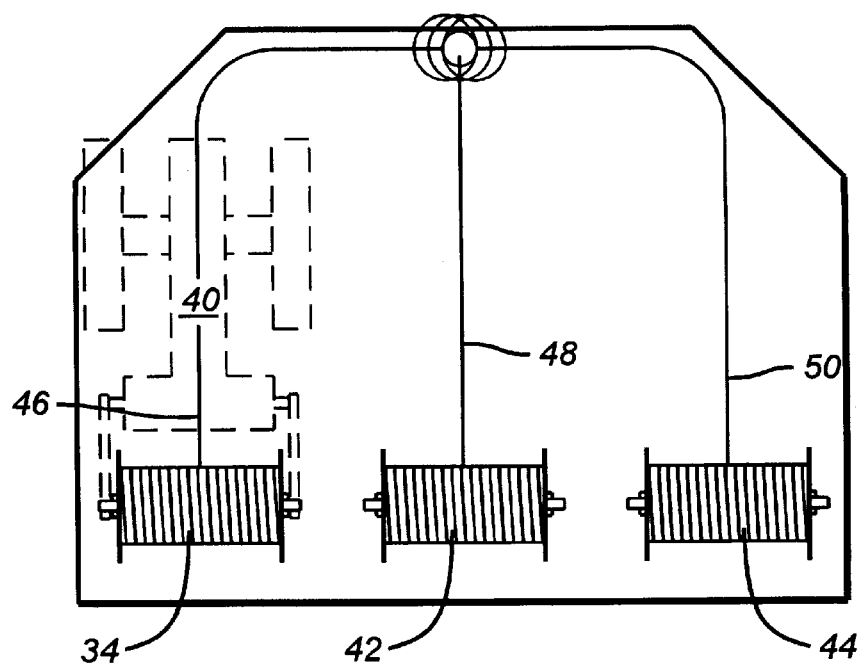
FIG. 3 is a plan view of the base shown in FIG. 2.
Figure 4:
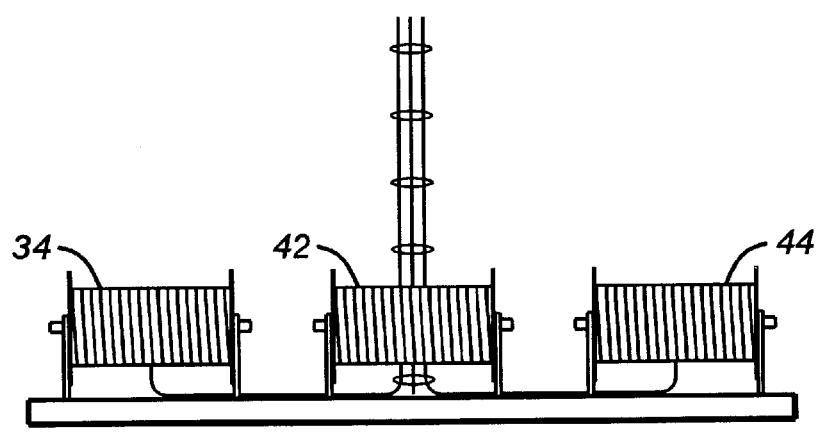
FIG. 4 is an elevation view of the base shown in FIG. 2.
Figure 6:
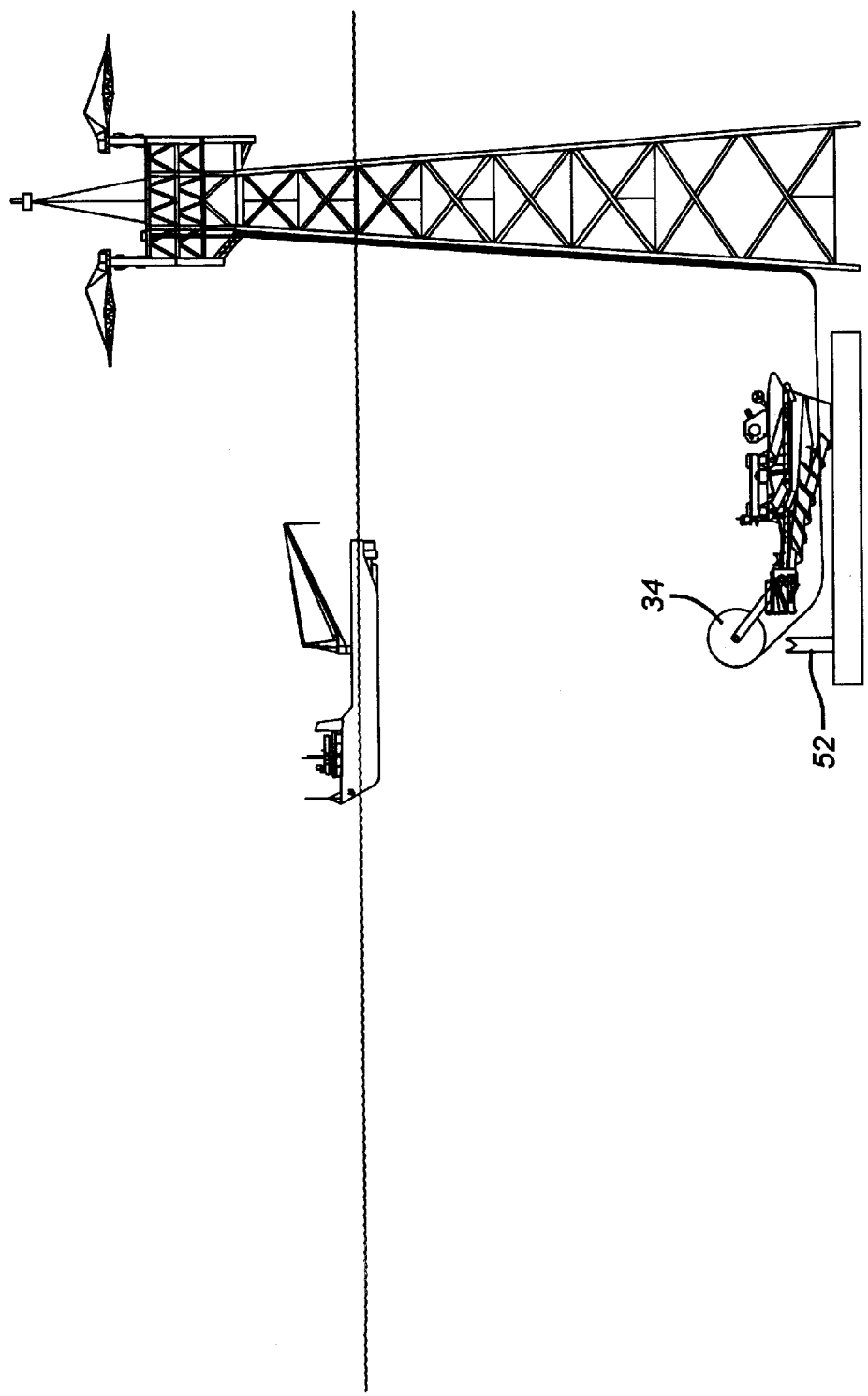
FIG. 6 illustrates the plow removing a spool from a cradle.
Figure 7:
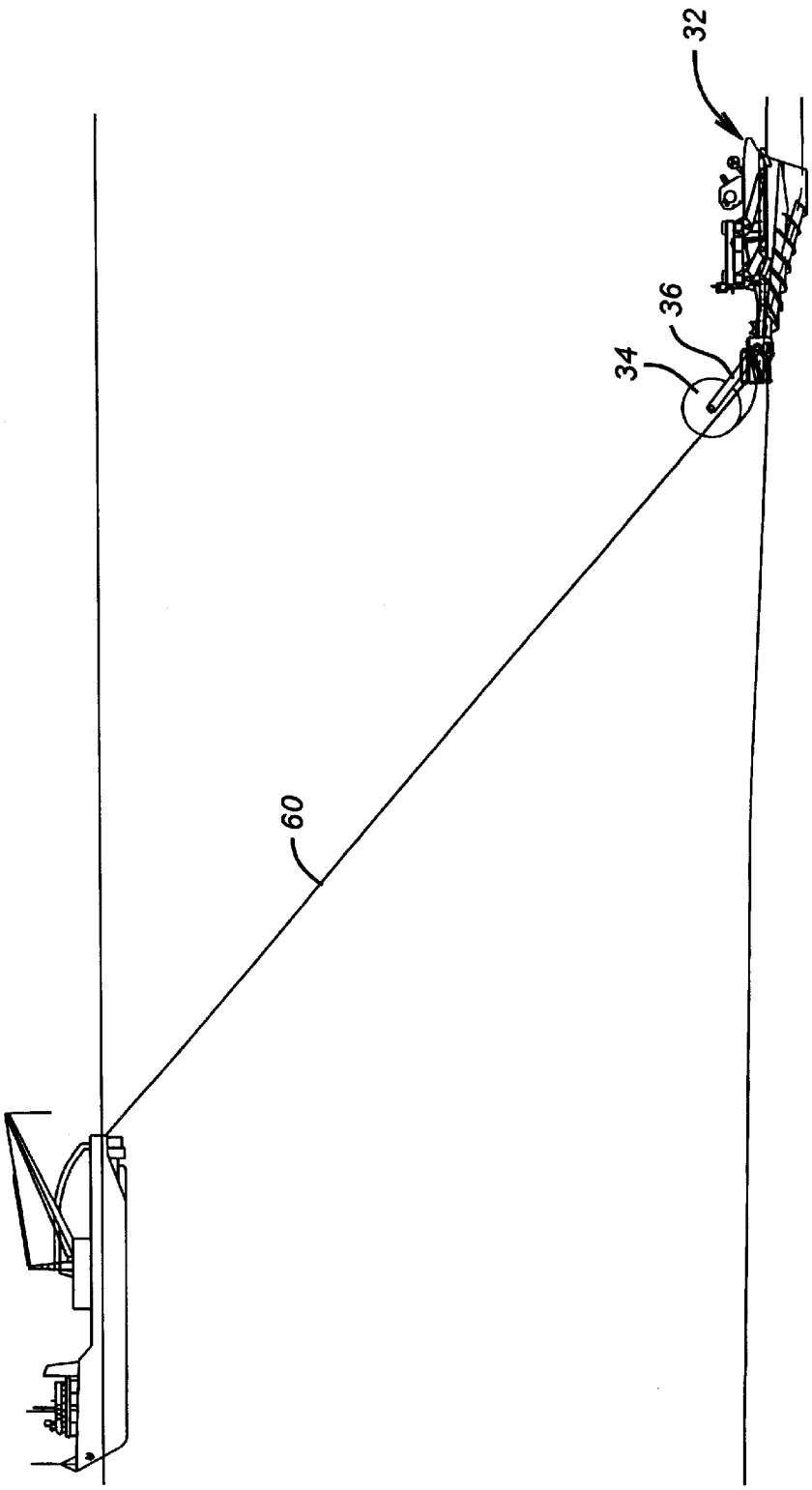
FIG. 7 illustrates the vessel pulling the plow off the base to lay and/or bury the cable.
Figure 8:
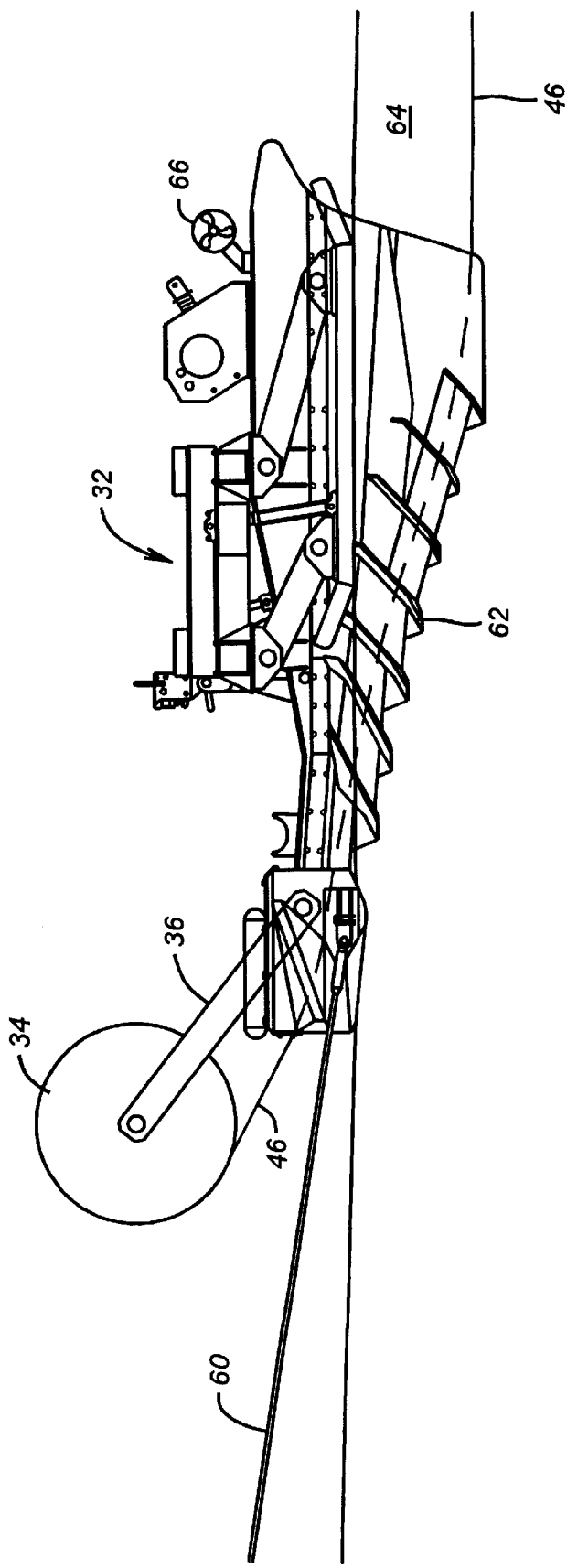
FIG. 8 is a detailed view of the plow shown in FIG. 7 laying/burying the cable.

In the preferred embodiment of the present invention for multiple cable lays, the initial step is to place a base 38 (see FIG. 2) on the seafloor (not shown). FIGS. 3 and 4 show the base in more detail. The base 38 is sufficiently large to have a landing area 40 for the plow adjacent to each spool 34, 42, and 44. Each of the spools 34, 42, and 44 are preconnected, respectively, by cables 46, 48, and 50 to the platform 30, as shown in FIG. 2. While three spools 34, 42, and 44 are shown in FIG. 3, any number of spools can be used on base 38 without departing from the spirit of the invention. While the plow 32 is shown with an articulated arm 36 to grab off spools 34, 42, or 44 from a cradle such as 52 (see FIGS. 5 and 6), it is also within the scope of the invention to mount a respective spool, such as 34, onto the plow 32 when the plow 32 is at the surface, i.e., on the deck of vessel 54. The method of the present invention proceeds as follows: A vessel 54 lowers the base 38 to the seafloor (not shown), as illustrated in FIG. 2. The base 38 is put adjacent the base of the platform 30. In the seismic application for the preferred embodiment, a series of cables, such as 46, 48, and 50, which are already secured on the platform 30, are lowered with the base 38 such that each cable is supported in a respective cradle 52 on a spool such as 34, 42, or 44. With the base 38 sitting on the seafloor, the vessel 54 lowers the plow 32 onto the landing area 40 adjacent to spool 34, for example. The articulated arm 36 is actuated from the surface. Using lights and underwater cameras (not shown) on the plow 32, the vessel 54 positions the plow 32 precisely in the landing area 40 using crane 56. With the plow 32 in position, the crane cable 58 is released and the tow line 60, which has previously been connected to the plow 32 before it is lowered, is then used to advance the plow 32 due to forward motion of the vessel 54. This sequence can be illustrated in looking at FIGS. 2, 5, 6, and 7. In FIG. 2, the base 38 is placed adjacent the platform 30 by vessel 54, using crane 56. In FIG. 5, the vessel 54 lowers the plow 32 into position on the base 38 adjacent to spool 34 with a line 58 and crane 56. The articulated arm 36 is then actuated from the surface vessel 54 to pick up the spool 34, as shown in FIG. 6. The tow line 60 shown in FIG. 7, which was previously connected to the plow 32, creates forward motion in the plow 32 as the vessel 54 begins to pull away from the platform 30. As shown in FIG. 8, a blade or a series of blades 62 create the trench 64 behind the plow 32 such that the cable, such as 46, can lay in the trench 64. The movement of the plow 32 can be controlled by the movement of the vessel 54. Propellor 66 helps to position the plow 32 as it is being lowered toward the base 38 to facilitate the articulated arm 36 being in a sufficiently close position to the spool, such as 34, to be able to take it off of its respective cradle 52. FIG. 7 shows the plow 32 being pulled with the spool 34 held by articulated arm 36. In the particular seismic application of the preferred embodiment, the entire cable is payed out off of spool 34. At that point, the vessel 54 positions itself above the plow 32 and lowers the crane cable 58 so that the plow 32 can be picked up to the surface for removal of spool 34 and be brought back into position over the base 38, as shown in FIG. 2. The process is then repeated for all the other spools, such as 42 and 44 on the base 38.

The details of the plow 32 are not described because those portions of the plow that perform the function of trenching are known in the art. In the preferred embodiment, the articulated arm feature 36 has been added, as well as lights and cameras (which are a standard plow item) necessary to facilitate the positioning of the plow 32 on the base 38. The plow 32 is pulled with a tow line 60 in a known manner. Because the articulated arm 36 can grab spools, such as 34, 42, and 44, in a repeating procedure, the design of the plow 32 can be made significantly more compact than trying to accommodate a plurality of spools, such as 34, on the plow 32 itself. However, it is within the scope of the invention to use facilities on vessel 54 to locate respective spools, such as 34, 42, and 44, on the plow 32 each time it finishes laying a particular cable, such as 46, 48, or 50. By using the technique of the preferred embodiment, involving the articulated arm 36, the plow 32 does not need to be placed on deck for the return trip back to the platform 30. Instead, after laying out an individual cable such as 46, the plow 32 is simply pulled by crane 56 out of the water and held close to the stern 24 as the vessel repositions itself adjacent the platform 30. The articulated arm 36 can offload the empty spool 34 onto the deck of the vessel 54. The base 38 can be optionally eliminated and the loading of full spools and unloading of empty spools can occur on the deck of the vessel 54. The vessel 54 would reposition the plow 32 adjacent the platform for subsequent cable runs. The plow 32 is on deck or out of the water as the vessel 54 repositions itself.

Those skilled in the art will appreciate that with the apparatus and method as described above, the cable, such as 46, does not have to be overengineered to support its own weight. Instead, with the spool, such as 34, mounted on the plow 32, the cable is merely payed out as the plow 32 is pulled by the tow line 60 in the known manner. Additionally, because the cables being laid do not have to be overengineered so that they can support their own weight for great distances, the spools are necessarily physically smaller and lighter, allowing the use of a smaller vessel 54, which saves the operator considerable time and expense. The technique is more reliable in that there are fewer opportunities for the cable, such as 46, to snap or otherwise be cut or damaged with the laying technique as described when compared to the technique of the prior art shown in FIG. 1.

While towing the plow 32 with a vessel 54 has been indicated to be the preferred embodiment, it is also within the purview of the invention to provide the propulsion directly on the plow so that it can not only lay the cable while steered from the surface, but it can also return to the base 38 to pick up a different spool. The disadvantage of self-propelling the plow is that the plow structure is much larger, heavier, and more expensive than a towed plow 32, as shown in FIGS. 2, 5, 6, and 7, and a vessel such as 54 is still needed to carry the spools to the site.

The foregoing disclosure and description of the invention are illustrative and explanatory thereof, and various changes in the size, shape and materials, as well as in the details of the illustrated construction, may be made without departing from the spirit of the invention.

I claim:

1. A method of distributing cable subsea adjacent the seafloor, comprising:
   positioning substantially the entire cable which is to be distributed adjacent the seafloor on a distribution device;
   moving the distribution device along the seafloor;
   positioning the cable adjacent the seafloor;
   using a plow as said distribution device;
   creating a trench due to movement of said plow;
   positioning the cable in the trench;
   positioning at least one cable spool on a frame;
   positioning the cable spool and frame subsea;
   transferring the cable spool from the frame to the plow.
2. The method of claim 1, further comprising:
   using a vessel to tow the plow.
3. The method of claim 2, further comprising:
   using the vessel to place the plow on the frame.
4. The method of claim 3, further comprising:
   using an articulated grip mechanism to remove the cable spool from the frame.

5. The method of claim 4, further comprising:

mounting the articulated grip mechanism on the plow.

6. The method of claim 5, further comprising:

providing a light source and camera on the plow to assist in surface manipulation of the plow to properly place it on the frame.

7. The method of claim 6, further comprising:

providing a surface-controlled steering capability on the plow to allow subsea orientation controlled from the surface for proper positioning of the plow on the frame.

8. The method of claim 7, further comprising:

using a crane on the vessel to place the plow on the frame and to retrieve the plow to the surface when a cable is fully payed out.

9. The method of claim 8, further comprising:

repositioning the plow over the frame after a cable has been payed out so that another cable spool can be acquired by the plow.

10. The method of claim 9, further comprising:

connecting one end of each cable on each spool to a surface platform;

laying out an array of buried cables extending from the frame.

11. The method of claim 1, further comprising:

using an articulated grip mechanism to remove the cable spool from the frame.

12. The method of claim 11, further comprising:

repositioning the plow over the frame after a cable has been payed out so that another cable spool can be acquired by the plow.

13. The method of claim 12, further comprising:

connecting one end of each cable on each spool to a surface platform;

laying out an array of buried cables extending from the frame.

14. The method of claim 13, further comprising:

using a vessel to tow the plow.

15. A method of distributing cable subsea adjacent the seafloor, comprising:

positioning substantially the entire cable which is to be distributed adjacent the seafloor on a distribution device;

moving the distribution device along the seafloor;

positioning the cable adjacent the seafloor;

using a plow as said distribution device;

creating a trench due to movement of said plow;

positioning the cable in the trench;

mounting at least one cable spool onto the plow when the plow is on the deck of a surface vessel;

using a crane to position the plow on the seafloor;

towing the plow with the vessel;

retrieving the plow with the cable spool when the cable spool is empty;

changing cable spools on the deck of the vessel;

connecting each spooled cable end to a surface platform before mounting the cable spool to the plow.

* * * * *